United States Patent
Honda et al.

[11] 3,968,198
[45] July 6, 1976

[54] METHOD FOR IMPROVING THE ADHERING ABILITY OF VULCANIZED RUBBER SURFACES

[75] Inventors: Toshio Honda; Shoji Tanaka, both of Akigawa; Yukio Fukuura, Kodaira; Yoshikatsu Suzuki; Itsuo Tanuma, both of Higashi-Murayama; Koichi Iwami, Kunitachi; Shoson Shibata, Tokyo, all of Japan

[73] Assignee: Bridgestone Tire Company Limited, Tokyo, Japan

[22] Filed: Jan. 28, 1974

[21] Appl. No.: 437,081

[30] Foreign Application Priority Data
Jan. 26, 1973 Japan.............................. 48-10775
Feb. 16, 1973 Japan.............................. 48-18418
May 12, 1973 Japan.............................. 48-52885

[52] U.S. Cl. .................................. 264/343; 264/232; 264/265; 423/365
[51] Int. Cl.² .................... B29C 25/00; C01B 21/12
[58] Field of Search ............. 423/365; 156/308, 96, 156/110 A; 264/36, 232, 340, 343, 265

[56] References Cited
UNITED STATES PATENTS

| | | | |
|---|---|---|---|
| 2,976,910 | 3/1961 | Nowak.................................. | 156/96 |
| 3,642,553 | 2/1972 | Georges................................ | 156/308 |
| 3,754,973 | 8/1973 | Spurlin.................................. | 156/308 |
| 3,755,165 | 8/1973 | Bhakuni et al....................... | 156/110 A |
| 3,846,160 | 11/1974 | Hirakawa et al.................... | 156/308 |

Primary Examiner—Jeffery R. Thurlow
Attorney, Agent, or Firm—Sughrue, Rothwell, Mion, Zinn & Macpeak

[57] ABSTRACT

A method for improving the adhering ability of a vulcanized rubber surface by treating said surface with a solution of iodine isocyanate or a mixed solution of iodine isocyanate and iodine to provide a high adhering ability to said surface.

The thus treated vulcanized rubber surface can be adhered strongly to other vulcanized rubber or the other various materials by contacting these materials tightly using an adhesive or without using an adhesive.

8 Claims, 7 Drawing Figures

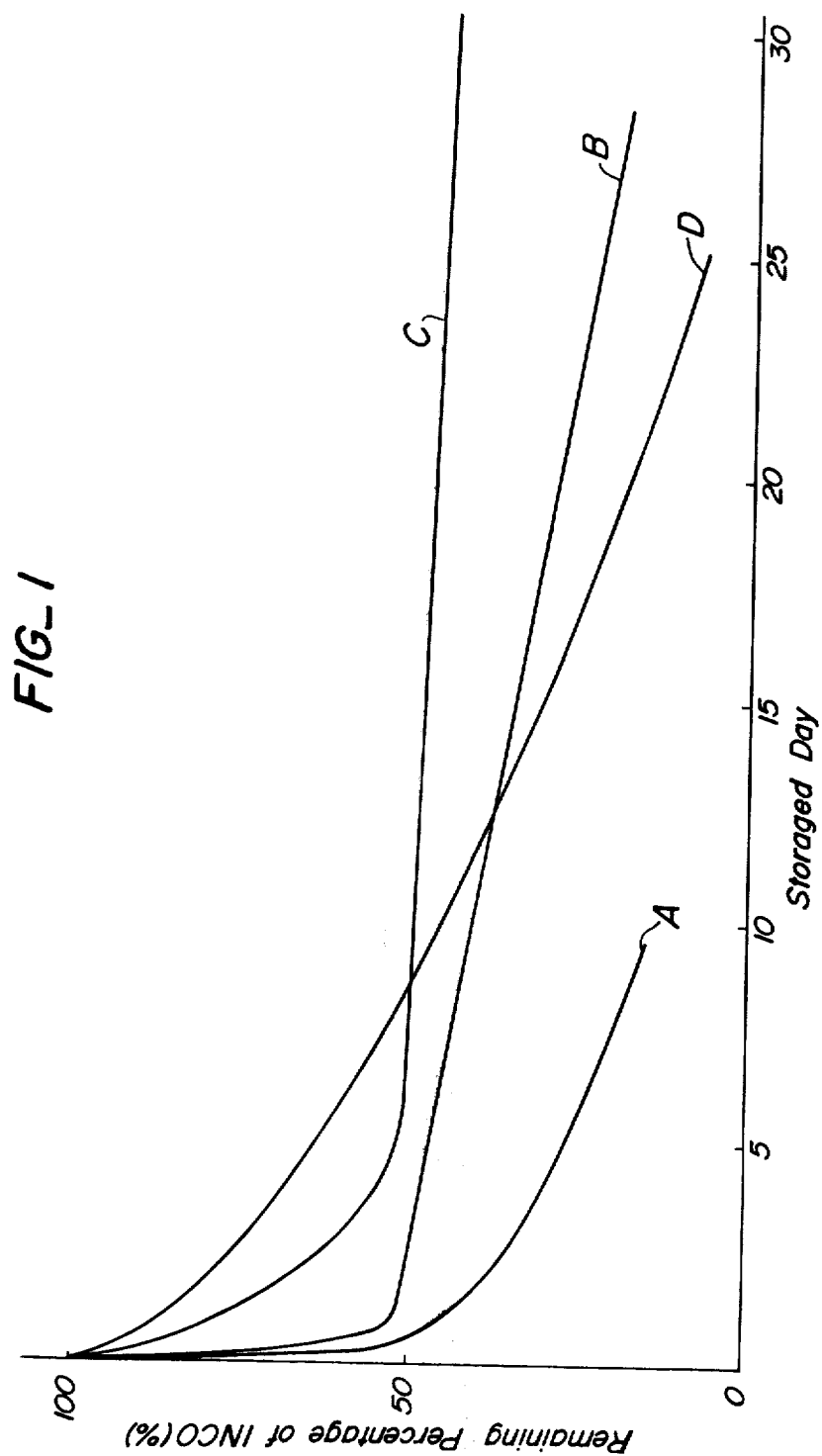

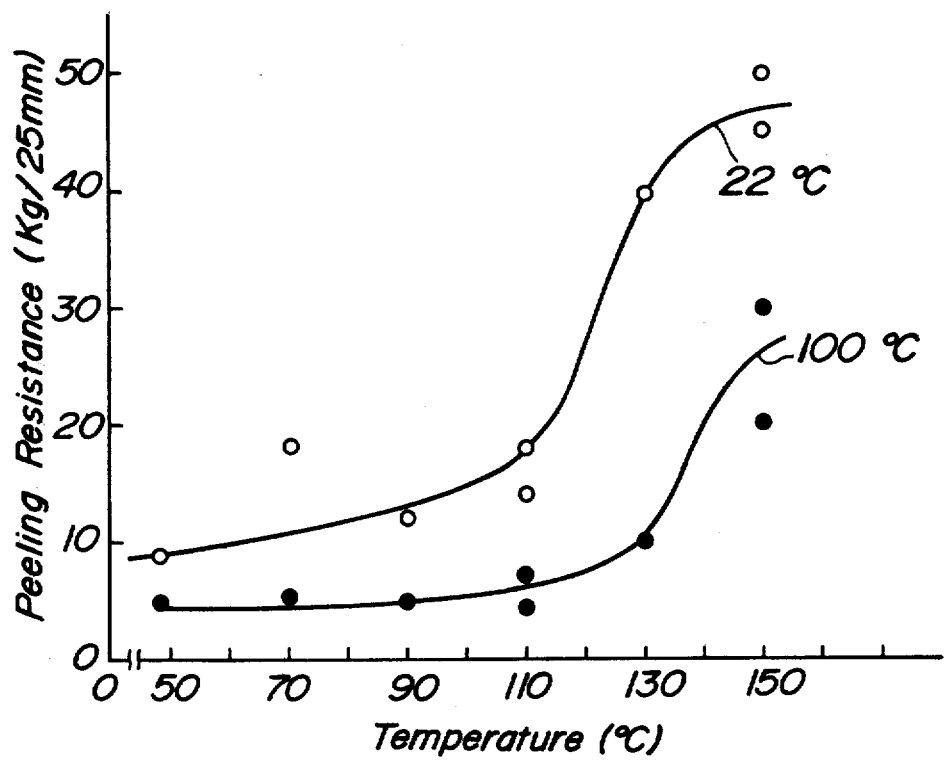

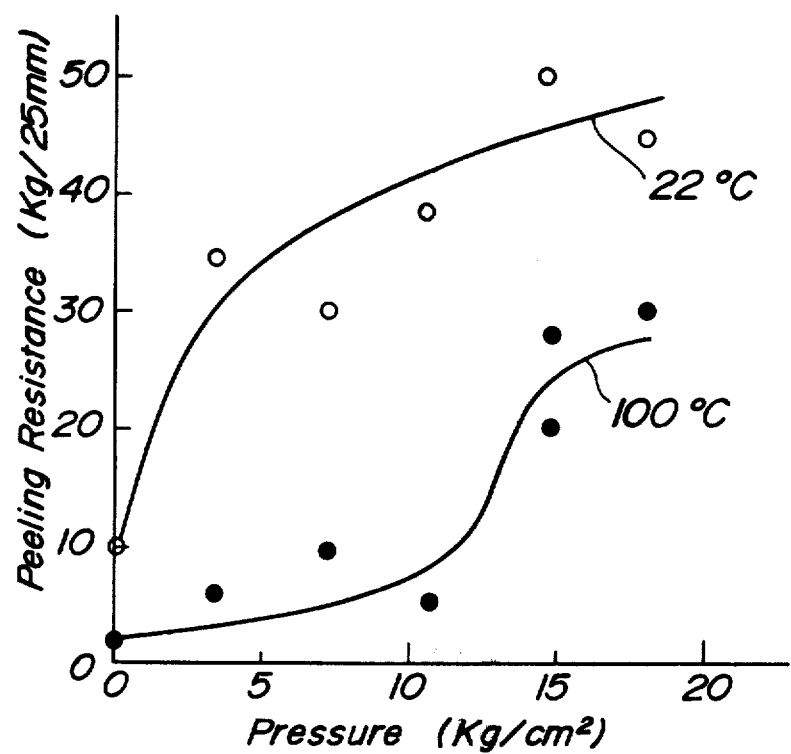

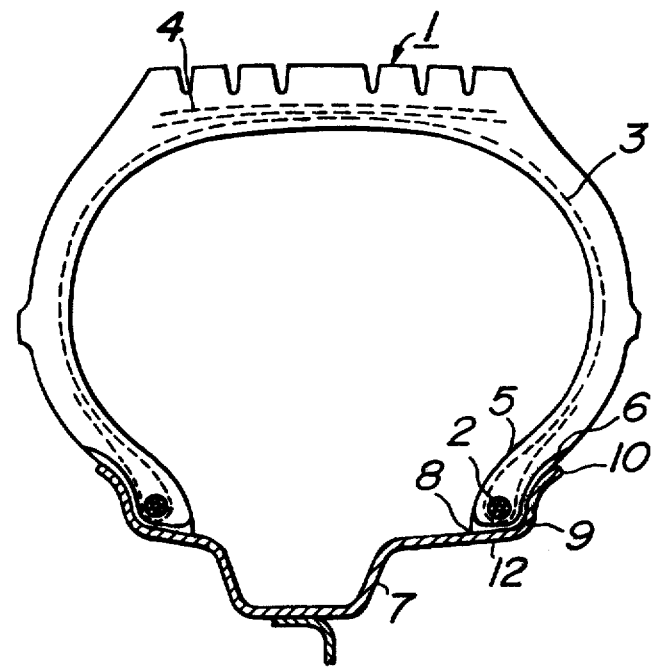
FIG_4
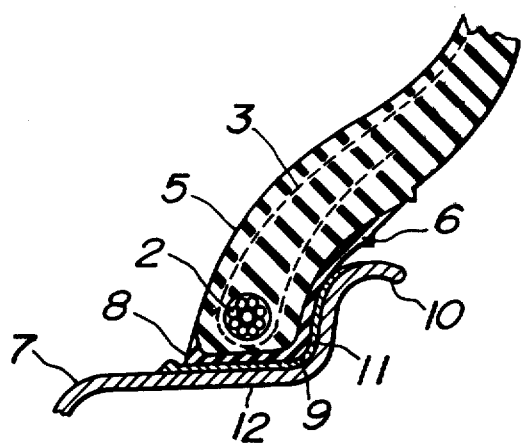
FIG_5

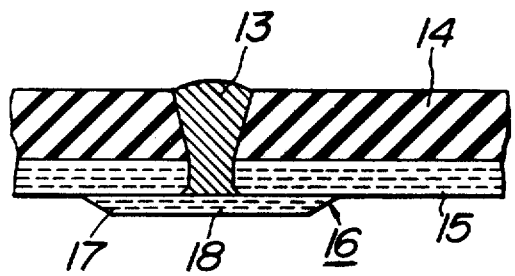
FIG_6
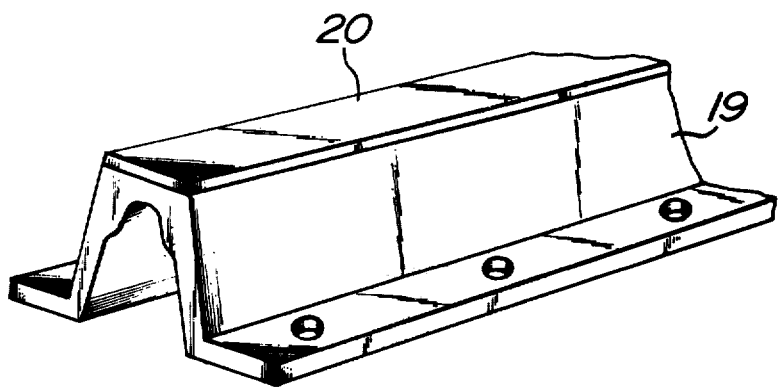
FIG_7

METHOD FOR IMPROVING THE ADHERING ABILITY OF VULCANIZED RUBBER SURFACES

BACKGROUND OF THE INVENTION

1. Field of the Invention

The present invention relates to a method for improving the adhering ability of the surface of vulcanized rubber.

2. Description of the Prior Art

It is generally difficult to adhere a vulcanized rubber to the other materials and such an adhering is more difficult than the case when an unvulcanized rubber is superposed on or contacted with the other materials and vulcanized and simultaneously adhered.

As a method for adhering a vulcanized rubber, it has been proposed that the surface of the vulcanized rubber is applied with a solution of a unvulcanized rubber in an organic solvent, such as toluene and the like, that is a rubber cement and dried, after which the thus treated vulcanized rubber and an unvulcanized rubber are superposed and pressed and vulcanized to ahdere the unvulcanized rubber to the vulcanized rubber. However, there is a defect that a mold corresponding to the requirement in an integrating molding must be manufactured in every molding and further a complicated mechanical apparatus is necessary for the pressing and heating. Furthermore, the object to be adhered is limited to the same kind of unvulcanized rubber.

As the other method, there has been proposed that a rubber cement obtained by dissolving unvulcanized polychloroprene (CR), acrylonitrile-butadiene copolymeric rubber (NBR), generally referred to as "nitrile rubber," a graft copolymeric rubber obtained by grafting a vinyl compound, such as methyl methacrylate and the like to the above described rubbers or blends of these rubbers with phenolic resins, in an organic solvent, is used for adhering the vulcanized rubber to the other materials, but this method cannot provide a satisfactory adhesion.

Moreover, there has been a process wherein a spontaneous vulcanizing rubber cement which vulcanizes at room temperature by using vulcanizing superaccelerators or sulfur chloride, is used, but this process also cannot provide a satisfactory adhesion.

As a surface treating process of a vulcanized rubber which has been heretofore carried out, there has been proposed that the surface of the vulcanized rubber is strongly oxidized with concentrated sulfuric acid, potassium permanganate, potassium dichromate and the like and washed with water to remove the above described treating agent and then the vulcanized rubber is bent to form fine cracks on the whole surface, thereafter the thus treated vulcanized rubber is applied with an adhesive and then adhered to the other materials.

However, the user of these strong acids or strong oxidizing agents must pay a full attention in the handling. Nevertheless, the adhesion is not satisfactory and the vicinity of the surface of the vulcanized rubber is deteriorated by such strong oxidizing agents.

In addition, it has been well known that the surface of a vulcanized rubber is treated with a solution of an organic polyisocyanate compound, for example, triphenylmethane triisocyanate solution (made by Bayer, Germany, Desmodur R (Trade Mark)) but this process was not possible to provide a satisfactory adhesion.

The present invention enables one to adhere strongly vulcanized rubbers mutually or a vulcanized rubber to the other various materials by using an ahdesive or without using an adhesive by treating the vulcanized rubber surface with a solution of iodine isocyanate or a mixed solution of iodine isocyanate and iodine to provide a high adhering ability on said surface and then contacting the thus treated vulcanized rubber with a vulcanized rubber or the other materials to be adhered tightly and pressing and heating them.

The method for improving the adhering ability of a vulcanized rubber surface according to the present invention can be effectively utilized particularly in the following fields;

a. composite materials, in which vulcanized rubber particles are dispersed and embedded in a matrix, b. a method for retreading pneumatic tires, c. pneumatic safety tires in which the bead portion and the bead seat of the rim are integrated, d. a method for partially repairing pneumatic tires, and e. a dock fender wherein a synthetic resin layer is integrally formed to an impact receiving portion.

A. It has been already known that vulcanized rubber particles can be dispersed in a castable polymer, for example, polyurethane elastomer. However, the inventors have found that the composite material produced by the conventional process has great defects. Namely, when a stress is periodically applied to such composite materials, a satisfactory bending fatigue resistance cannot be obtained. The composite material produced by the conventional process in which black vulcanized rubber particles compounded with carbon are dispersed in a colorless and transparent polyurethane elastomer matrix, is generally seen black but when this composite material is bent and the bent surface is observed, it is found that the maximum bent portion, that is, only a zone where the stress has most concentrated, is seen to be white so that said portion floats. This is because numerous fine breakages are formed inside the portion where the stress concentrates.

B. As the method for retreading pneumatic tires, it has been known that a vulcanized tread rubber is wholly or partially fixed to a base tire to be retreaded. The prior such type method is as follows as shown in U.S. Pat. No. 2,976,910.

A tread rubber layer of tire run for a given distance is carefully removed and said tire is subjected to a buffing and then on the resulting base tire, a vulcanized or semi-vulcanized tread rubber layer having a tread pattern is forcedly contacted through an unvulcanized rubber sheet and then the assembly is pressed and heated, whereby the vulcanization and adhering are effected. Even if this method has made various improvements as compared with the conventional methods for retreading tires, there are the following defects.

That is, since the vulcanization step is necessary, the installation therefor is necessary.

By selecting the quality of the rubber to be inserted between the base tire and said vulcanized tread rubber layer, a certain variation may be made but the heating is essential for the vulcanization and this heating brings about the heat deterioration of the base tire. For solving this defect, the vulcanization at a low temperature for a long time has been proposed but this means lowers the production efficiency and particularly in the spontaneous vulcanizing rubber the adhesion is defficient. In addition, in the use of an adhesive, the defficiency of the adhesive has never been solved.

C. The pneumatic tire has the following skeleton struture. A pair of bead wires having ring forms composed of non-elongating metal wires are provided at a space in the axial direction of tire and carcass plies in which the cords composed of fibers, such as textile, metal or glass are covered with a rubber, are held and secured in a toroidal form aside from one bead wire to another bead wire.

Such a pneumatic tire is set to a rim in the following manner. A bead seat of the rim mounts the bead portion housing the above described head wire and supports the whole tire and air is filled in the inside of the tire and the inner pressure of the filled air compresses the bead portion to the bead seat of the rim which inclines at a given angle against the axial direction of tire and the rim flange which limits the outer periphery of the bead seat.

This compressing force is strong and therefore, of course, when the tires run straightly and even when the running direction of tires is curved and the tires are subjected to the force of the axial direction of tires (referred to as "side force" hereinafter), if said force is mild, the bead portion neither separates nor gets out from the bead seat of the rim.

However, when the car speed is high over a certain degree, if a particularly large side force is applied as when the tires are rapidly curved, the side force becomes larger than the compressing force owing to the inner pressure and the bead portion separates or may get out from the bead seat. When a tube is used in the inner portion of the tire, the unstability of the handle and the cutting of the tube only occur. However, in the tubeless tire recently broadly used in view of safety against puncture, which is caused, for example, by stepping on a nail, in which a rubber sheet having a given thickness is adhered to the inner surface of the tire and a tube is omitted, said tire and the rim are directly sealed at the bead portion, so that as soon as the bead portion is separated from the rim flange in the manner as described above, the inner pressure is rapidly exhausted and such a case is very dangerous.

Therefore, the tire designers have attempted to make the compression of the bead wire to the rim fully strong but if such a means is adopted, it is very difficult to set the tire into the rim.

On the other hand, in such a type tire that the tire and the rim are integrated by the inner pressure in this manner, if the inner pressure is exhausted or decreased owing to any cause, the tire separates from the rim and gets out from the rim and the running becomes impossible or if this phenomenon occurs suddenly, there is a possibility of occurrence of a great accident.

Heretofore, various attempts have been made for solving this problem.

For example, Japanese laid open Pat. application No. 4,552/71 and U.S. Pat. No. 3,669,174 disclose that the bead portion is mechanically fixed from the inside and outside of the tire.

Alternatively, West Germany laid open Pat. application No. 2,055,172 discloses that the rim and the tire are pressed and heated to effect vulcanization and adhering.

In the former process, the cost of the rim raises and further when the inner spacer and the outer spacer are bound by bolts and the like, the airtight sealing process is complicated and this process is not reliable.

In the latter process, the surface treatment of the rim and the large size apparatus are necessary and this process cannot be simply effected. A simple and effective method for adhering the tire to the rim, by which the defects of these prior technics, can be obviated and the pneumatic tires and rims are strongly and simply integrated, so that when the tires run on road in normal state, even if a greatly large side force occurs, the tires neither separate nor get out from the rims, and further even if the inner pressure of the tires decreases or in an extreme case, is exhausted, the tires do not get out from the rims and can run safely and in which, if necessary, the tires can be removed from the rims relatively easily, has been demanded.

D. Some methods for partially repairing tires have been known. In these methods, when a damaged hole which perforates from the tread rubber layer to the carcass layer (rubber applied cord cloth layer), is caused by a sharp rock or metal piece and the like, muddy soils and the like around the damaged portion are removed by washing and then a rubber is embedded into the damaged hole and said portion is partially pressed and heated to effect a partial vulcanization or said portion is embedded with a spontaneous vulcanizing rubber in order to omit the vulcanization step.

However, the tire to be repaired is composed of a vulcanized rubber and as well known, the vulcanized rubber has many difficulties in the adhering and therefore the circumference of the damaged hole must be previously subjected to buffing, applied with a rubber cement (a solution of unvulcanized rubber dissolved in an organic solvent, such as gasoline) and then fully dried, after which the thus treated damaged hole is embedded with a rubber. Accordingly, this method is very troublesome and nevertheless the adhesion is low and the complete repairing cannot be made.

E. It has been already known that synthetic resins, such as polyurethane resins, epoxy resins, polyethylene resins and the like are adhered to the surface of an impact receiving portion of a dock fender composed of a vulcanized rubber to protect the rubber body from abrasion and impact due to the impact of ships. However, the adhesion of the synthetic resins to the rubber is poor, so that the synthetic resins are readily separated and dropped off due to the difference of elastic strain and satisfactory dock fender has never been obtained.

The object of the present invention is to solve the above described various problems which are caused because of the low adhesion of the vulcanized rubber, by providing a high adhering ability to the surface of the vulcanized rubber in order to obtain a strong adhesion between mutual vulcanized rubbers or between a vulcanized rubber and the other various materials and to provide, a. composite materials having a satisfactory bending fatigue resistance in which vulcanized rubber particles are dispersed and embedded in a matrix, b. a method for retreading pneumatic tires by which any vulcanization step for adhering is omitted and the retreated pneumatic tires having a high durability can be obtained, c. a safety tire in which the bead portion of pneumatic tire and the bead seat in the rim are strongly and simply integrated, d. a method for partially repairing tires in which the repairing operation is easy and can be effected in a short time and further a high durability is obtained and the performance of the retreated tire is not lowered by the repairing, and e. a dock fender in which a synthetic resin layer is strongly integrated with the dock fender body composed of the vulcanized rubber. Furthermore, the present invention can be applied broadly to industrial articles, for example, endless workings of conveyor belts and rubber crawlers and the method of the present invention can be effectively used for molding of articles, in which the vulcanized rubber is a constituting element.

SUMMARY OF THE INVENTION

The present invention relates to a method for improving the adhering ability of the surface of the vulcanized rubber in which the surface of the vulcanized rubber is previously treated with a solution of iodine isocyanate or a mixed solution of iodine isocyanate and iodine. The vulcanized rubber, the surface of which has been improved by the present invention, can be strongly adhered to the other vulcanized rubber or the other various materials by contacting the improved vulcanized rubber with the other vulcanized rubber or the other various materials tightly and pressing and heating them using an adhesive or without using an adhesive.

As mentioned above, it has been well known that the surface of the vulcanized rubber is treated with a solution of an organic polyisocyanate compound, for example, a solution of triphenylmethane triisocyanate (made by Bayer, German, Desmodur R (Trade Mark)), but this process can not provide a desirable adhesion. However, if the surface of the vulcanized rubber is treated with a solution of iodine isocyanate, in spite of the fact that iodine isocyanate is monoisocyanate, a very strong adhesion can be obtained. This difference is based on the fact that the organic polyisocyanate compound is difficulty chemically reacted with the surface of the vulcanized rubber, while iodine isocyanate is easily and rapidly added to unsaturated bonds of polymer exposed on the surface of the vulcanized rubber. It has never been known that iodine isocyanate is effective in such a manner for the adhering of the vulcanized rubber.

Iodine isocyanate (INCO) is different from the other organic isocyanate and shows a specific reactivity and reacts with the unsaturated double bond as follows.

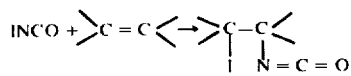

Such a reaction cannot be expected in the treatment with an organic polyisocyanate, for example, Desmodur R. Accordingly, in the case of Desmodur R the adhesion is low.

The inventors have found that the properties of the surface of the vulcanized rubber are rapidly changed only by applying a solution of iodine isocyanate to the surface of the vulcanized rubber at room temperature, to form the surface which can be very easily adhered.

Furthermore, the inventors have found that when there is any possibility of deterioration of the rubber surface, if the surface of the vulcanized rubber is treated with a mixed solution of iodine isocyanate and iodine, it is possible to prevent the deterioration of the rubber surface and to improve the adhering ability of the surface of the vulcanized rubber satisfactorily and effectively.

It has been observed that when a brush and the like used in the treatment of the vulcanized rubber with a solution mainly consisting of the above described iodine isocyanate is left to stand and the solvent is volatilized, the remaining solidified substance causes a small explosion of a slight degree owing to a slight shock. The inventors have found that in the treatment of the vulcanized rubber with the solution mainly consisting of iodine isocyanate, if said solution is used by mixing treating assistants mentioned in detail hereinafter, the above described small explosion does not occur and the surface treatment can be safely effected.

When the vulcanized rubber, the surface of which has been improved by the method of the present invention, is to be adhered to the other vulcanized rubber or the other various materials using an adhesive, various adhesives can be used. Among them the adhesives capable of curing through the progress of hydrogen transfer reaction of electrophilic group with nucleophilic group or the adhesives of chain extended thermoplastic resins formed by the reaction of electrophilic group with nucleophilic group of the thermosetting resins which are thermally cured by cross-linkage through the reaction of electrophilic group with nucleophilic group, are preferable.

According to the present invention, it is possible to strongly adhere mutual vulcanized rubbers or the vulcanized rubber with the other various materials, and therefore when the articles where the vulcanized rubbers are used for adhering are produced, the method of the present invention can be utilized in various modes.

Particularly, in the fields of
a. composite materials in which the vulcanized rubber particles are dispersed and embedded in a matrix composed of castable polymers,
b. a method for retreading the pneumatic tires,
c. a pneumatic safety tire in which the bead portion and the bead seat are integrated,
d. a method for partially repairing the pneumatic tires, and
e. dock fenders in which a synthetic resin layer and the impact receiving portion are integrated and the like, the present invention have solved various problems which have been encountered because of the low adhering ability of the vulcanized rubber, and can accomplish the above described objects (a)-(e). Therefore, the present invention has very high commercial merits.

BRIEF DESCRIPTION OF THE DRAWINGS

FIG. 1 is a diagram showing the storage stability of various treating solutions containing iodine isocyanate to be used in the method for improving the vulcanized rubber surface according to the present invention;

FIGS. 2 and 3 are diagrams showing the results of peeling test when the vulcanized rubbers, the surfaces of which have been improved by the method of the present invention, are mutually contacted tightly and then pressed and heated;

FIG. 4 is a cross-sectional view of the pneumatic safety tire obtained by utilizing the present invention;

FIG. 5 is a detailed view showing the structure for binding the vicinity of the bead portion to the rim of the embodiment as shown in FIG. 4;

FIG. 6 is a view for explaining the method for partially repairing tire utilizing the present invention; and FIG. 7 is a perspective view of the dock fender, which has been produced using the method of the present invention.

DESCRIPTION OF THE PREFERRED EMBODIMENTS

The present invention relates to a method for adhering the vulcanized rubber and more particularly to a method for adhering a vulcanized rubber to a vulcanized rubber or a vulcanized rubber to the other various materials.

The term "vulcanization" used herein means the introduction of three dimensional cross-linked structures between rubber molecules. Thus, thiuram vulcanization, peroxide vulcanization, quinoid vulcanization, resin vulcanization, metal salt vulcanization, metal oxide vulcanization, polyamine vulcanization, radiation vulcanization, hexamethylenetetramine vulcanization, urethane cross-linker vulcanization and the like are included in addition to sulfur vulcanization which is usual and most important.

Rubbers involve natural rubbers (NR) and synthetic rubbers.

Synthetic rubbers include homopolymers of conjugated diene compounds, such as isoprene, butadiene, chloroprene and the like, for example, polyisoprene rubber (IR), polybutadiene rubber (BR), polychloroprene rubber and the like; copolymers of the above described conjugated diene compounds with vinyl compounds, such as styrene, acrylonitrile, vinyl pyridine, acrylic acid, methacrylic acid, alkyl acrylates, alkyl methacrylates and the like, for example, styrene-butadiene copolymeric rubber (SBR), vinylpyridine-butadiene-styrene copolymeric rubber, acrylonitrile-butadiene copolymeric rubber, acrylic acid-butadiene copolymeric rubber, methacrylic acid-butadiene copolymeric rubber, methyl acrylate-butadiene copolymeric rubber, methyl methacrylate-butadiene copolymeric rubber, acrylonitrile-butadiene-styrene terpolymer and the like; copolymers of olefins, such as ethylene, propylene, isobutylene and the like with dienes, for example isobutylene-isoprene copolymeric rubber (IIR); copolymers of olefins with non-conjugated dienes (EPDM), for example, ethylene-propylene-cyclopentadiene terpolymer, ethylene-propylene-5-ethylidene-2-norbornene terpolymer and ethylene-propylene-1,4-hexadiene terpolymer; polyalkenamer obtained by ring opening polymerization of cycloolefins, for example, polypentenamer; rubbers obtained by ring opening polymerization of oxirane ring, for example, polyepichlorohydrin rubber and polypropylene oxide rubber which can be vulcanized with sulfur, and the like. Furthermore, halides of the above described various rubber, for example, chlorinated isobutylene-isoprene copolymeric rubber (Cl-IIR), brominated isobutylene-isoprene copolymeric rubber (Br-IIR) and the like are included.

Particularly, the present invention is characterized in that the surfaces of the vulcanized rubbers of natural rubber (NR), styrene-butadiene copolymeric rubber (SBR), polybutadiene rubber (BR), polyisoprene rubber (IR), isobutylene-isoprene copolymeric rubber, halides of these rubbers (Cl-IIR, Br-IIR) and copolymers (EPDM) of olefins with non-conjugated dienes, which are poor in the adhering ability, are improved to provide them a high adhering ability. Of course, the present invention can be applied to the other rubbers. All these rubbers may be kneaded with compounding agents conventionally used for compounding with rubber, for example, fillers, such as carbon black, silica, calcium carbonate, lignin and the like, softening agents, such as mineral oils, vegetable oils, synthetic plasticizers prior to the vulcanization and then vulcanized.

The vulcanized rubbers, the surface of which has been improved according to the present invention, can be easily adhered to the other materials.

As these adhesives, mention may be made of polyurethane resins, epoxy resins, phenol aldehyde resins, polyhydric phenol aldehyde resins, phenol furfural resins. xylene aldehyde resins, urea formaldehyde resins, melamine formaldehyde resins, alkyd resins, polyester resins and the like.

These resins have electrophilic groups and when these resins are added with an agent having nucleophilic groups, that is a compound having an active hydrogen, for example, an amine compound, a reaction occurs between the electrophilic groups and the nucleophilic groups and the two dimensional or three dimensional intermolecular reaction gradually proceeds and the curing occurs.

Among the above described adhesives, polyurethane resins and epoxy resins which have a relatively similar elasticity to the tensile elasticity of the vulcanized rubber are preferred.

Since it has been known that these polyurethane resin and epoxy resin adhesives are effective for adhering various materials, for example, inorganic materials, such as metals, ceramics, earthenwares, porcelains, glasses and the like and organic materials, such as natural fibers, synthetic fibers, papers, natural leathers, synthetic leathers, synthetic resins and the like, it has become possible to adhere the vulcanized rubber to the above described materials through the above described adhesives. Furthermore, the same kind of vulcanized rubbers or different kind of vulcanized rubbers can be adhered mutually.

As the adhesives in the present invention, other than the adhesives having such a property that the curing proceeds owing to the reaction of the electrophilic group with the nucleophilic group, the adhesive consisting of a chain extended thermoplastic resin obtained by the reaction of the electrophilic group with the nucleophilic group, has also a high adhesive effect.

An embodiment of adhesive which is not effective in the method of the present invention, is an adhesive which has been used as a hot melt type adhesive, for example, a non-reactive type adhesive, such as ethylene-vinyl acetate copolymer (EVA).

It is possible to mix various extenders, softening agents and other compounding agents to the adhesives to be used in the present invention prior to curing as long as the object is not deviated. For example, carbon black, silica, calcium carbonate, calcium sulfate, clay, sulfur, various metal powders, metal oxide powders, inorganic fiber powders, organic fiber powders, plastic powders, wood powders, cork powders, stone powders, rubber powders, corn powders, vegetable oils, mineral oils, petroleum fractions, petroleum series softener, synthetic plasticizers, asphalt, coal tar, various antioxidants, ozone crack preventing agents may be compounded conveniently.

The further surprising facts have been found by the inventors.

Namely, the vulcanized rubbers, the surfaces of which have been improved by the method of the present invention, can be easily adhered only by contacting mutually these surfaces tightly and then pressing and heating them. In this case, the pressure to be applied is sufficient at higher than 0.01 Kg/cm² and the heating temperature is sufficient at higher than 40°C but the preferable pressure and temperature are 2.0 Kg/cm² – 100 Kg/cm² and 88°C–200°C, respectively. The more preferable temperature and pressure are 130°C–180°C and 5 Kg/cm² – 50 Kg/cm², respectively. The heating time is sufficient at 2–5 minutes.

The surface of the vulcanized rubber treated with the method of the present invention cannot be distinguished by the naked eye in the appearance from the surface of the untreated vulcanized rubber. It is quite surprising that such bodies which are solid and do not show fluidity even at a raised temperature, are adhered strongly in a very short time by the above described simple process.

Similarly, the vulcanized rubber treated with the method of the present invention can be adhered strongly to usual elastomers hardened by curing in the same manner as described above without using any adhesives.

It is further surprising that if the surface of the vulcanized rubber treated with the method of the present invention is contacted with a cleansed metal surface tightly and pressed and heated, a certain degree of adhesion can be obtained without using any adhesive. More desirable and strong adhesion can be obtained by coating a primer on the metal surface.

As the primers use may be made of commercially available Chemlok No. 218 (made by U.S.A Hughson Chemical Company, Division of Lord Corporation), Conap No. 1146 (made by U.S.A. Conap Corporation), phenol formaldehyde resins, epoxy resins, urea resins, melamine resins and the like.

The above described method can be applied to inorganic materials, such as ceramics, glasses and the like and organic materials, such as woods, if these materials can endure the above described heating temperature and pressure, so that the present invention can be utilized for the production of various products, for example, vibration proof apparatus and sound proof apparatus.

An explanation will be made with respect to the method for treating the surface of vulcanized rubber according to the present invention.

Iodine isocyanate is present in solvents, such as ether compounds and the like. These solvents are, for example, dimethyl ether, tetrahydrofuran, ethylene glycol dimethyl ether, dioxane and the like. The solution of iodine isocyanate in ether can be easily obtained, for example, by adding silver cyanate (AgOCN) to a solution of iodine ($I_2$) in ether, stirring the resulting mixture and filtering the precipitate, silver iodide (AgI). When tetrahydrofuran is used as a solvent, the temperature must be kept to lower than −60°C in order to prevent completely the decomposition of iodine isocyanate. While, when dioxane is used as an ether compound, a solution of iodine isocyanate in dioxane can be easily obtained at room temperature, and moreover the storage stability of the iodine isocyanate solution is remarkably improved as compared with the case when an ether series solvent, such as tetrahydrofuran, is used, and this iodine isocyanate solution can be safely storaged from a temperature of refrigerator to room temperature and therefore is particularly effective. This fact is found out by the inventors.

In the present invention, other inert dehydrated solvents, for example, aromatic hydrocarbons and saturated alkyl-substituted aromatic hydrocarbons, such as benzene, toluene, xylene, etc., and paraffinic hydrocarbons, such as hexane, pentane, octane, etc., may be mixed to the solution of iodine isocyanate in ether. The concentration of iodine isocyanate, when dioxane or tetrahydrofuran is used as a solvent, is not less than 0.01% by weight. However, when the concentration of iodine isocyanate becomes not less than 5% by weight, the reaction in the treatment is too violent and numerous fine cracks are formed on the surface layer of vulcanized rubber, and deterioration may be observed. This tendency is often observed in NR and BR, but is not observed in EPDM. Accordingly, iodine isocyanate is used within the concentration range in a solvent of 0.01 to 15% by weight, preferably 0.1 – 5% by weight. Particularly, it is surprising that even when the surface of vulcanized rubber is treated with a very diluted solution of about 0.1% by weight, such diluted solution is still effective.

The inventors further have found that if there is a fear of the deterioration of rubber surface, the surface of vulcanized rubber is treated with a solution of iodine isocyanate added with iodine, that is, a mixed solution of iodine isocyanate and iodine, and the deterioration of the surface of vulcanized rubber can be prevented and the surface can be satisfactorily and effectively improved. Moreover, the addition of iodine to the iodine isocyanate solution gives a good result in the storage stability of iodine isocyanate.

When iodine is used in an amount of at least 0.1 mole based on 1 mole of iodine isocyanate, the effect of iodine appears. A preferable amount of iodine is 0.3 – 10 moles, and a particularly preferable amount thereof is 0.5 – 2 moles, based on 1 mole of iodine isocyanate.

As the means for treating the surface of vulcanized rubber with the above described iodine isocyanate solution or mixed solution of iodine isocyanate and iodine, any commercial means by which the surface of vulcanized rubber contacts with the above described solutions, such as application with brush, spraying, dipping, etc. can be adopted. In the conventional method for adhering vulcanized rubber, the surface of vulcanized rubber must be previously subjected to buffing as a preparatory step by means of sand paper or grinder to expose a new coarse surface of vulcanized rubber. However, in the present invention, this buffing is not necessary. That is, according to the present invention, even a remarkably smooth rubber surface can be adhered to the other materials or another vulcanized rubber piece. Accordingly, composite articles having a very precise dimension can be produced by using a vulcanized rubber. Moreover, the buffing treatment as a preparatory step can be omitted in the present invention, and therefore the present invention is remarkably valuable in view of simplifying the adhering operation.

The amount of iodine isocyanate to be used for the treatment of vulcanized rubber is within the range of about 0.001 – 500 mg, preferably about 0.01 – 20 mg, per 1 cm² of the surface of vulcanized rubber. When the amount is less than 0.001 mg, the effect does not appear, while when the amount exceeds 500 mg, the effect does not increase in proportion to the increased amount.

As described above, the solution of iodine isocyanate in dioxane is superior to that of iodine isocyanate in tetrahydrofuran or other solvents in the storage stability. However, the inventors have made further investigations and found that when an organic isocyanate is added to the solution of iodine isocyanate or to the mixed solution of iodine isocyanate and iodine, the storage stability of iodine isocyanate can be more improved. As the organic isocyanate, mention may be made of tolylene diisocyanate, naphthalene diisocyanate, hexamethylene diisocyanate, phenylene diisocyanate, diphenylmethane diioscyanate, diamisidine diisocyanate, tolidine diisocyanate, chlorophenyl isocyanate, methyl isocyanate, ethyl isocyanate, butyl isocyanate, octadecyl isocyanate, polymethylenepolyphenyl isocyanate, triphenylmethane triisocyanate, trans-vinylene diisocyanate, tris-phenyl isocyanate thiophosphate) and the like. The amount of the organic isocyanate to be compounded to the solution of iodine isocyanate is within the range of 1 - 2,000 parts by weight, preferably 100 - 500 parts by weight, per 100 parts by weight of iodine isocyanate. Particularly, a mixed solution prepared by compounding tolylene diisocyanate to a solution of iodine isocyanate in dioxane has a sufficiently high storage stability even at room temperatuure, and is most advantageously used. This fact will be easily understood from FIG. 1.

FIG. 1 shows a relation between the remaining percentage and storaged day of iodine isocyanate. In FIG. 1, the curve A is the case when tetrahydrofuran is used as a solvent, and the iodine isocyanate solution is left to stand at 5°C. The curve B is the case when tolylene diisocyanate is added to the solution of the curve A, and the resulting solution is left to stand at 5°C. The curve C is the case when iodine is further added to the solution of the curve B, and the resulting solution is left to stand at 5°C. The curve D is the case when dioxane is used as a solvent, and tolylene diisocyanate is added to the iodine isocyanate solution, and then the resulting solution is left to stand in a room kept at 22°C. In this experiment, the concentration of iodine isocyanate was measured by the iodometry. The initial concentration of iodine isocyanate was 3% by weight. It will be obvious from FIG. 1 that the addition of tolylene diisocyanate and iodine and the use of dioxane as a solvent are effective.

Iodine isocyanate is fairly easily decomposed at room temperature, and the decomposed products are not yet clarified. It seems that peroxides are probably formed, but the formation of peroxides is not yet ascertained. However, it is observed that when a brush used in the treatment of a vulcanized rubber with the above described solution containing iodine isocyanate is left to stand, the remaining solidified substance causes a slight small explosion by a weak shock.

In order to treat safely a surface of vulcanized rubber with a solution of iodine isocyanate without causing the above described small explosion, it is preferable to use a mixture of iodine isocyanate and a treating solution assistant. This treating solution assistant will be explained minutely hereinafter.

It has been found that when an iodine isocyanate solution containing the treating solution assistant is used, and adhesion between two vulcanized rubbers or between a vulcanized rubber and the other material is excellent similarly to the case when an iodine isocyanate solution containing no treating solution assistant is used. That is, a surface of a vulcanized rubber can be safely treated in the following manner. After the rubber surface is treated with an iodine isocyanate solution containing the treating solution assistant, a low melting point solvent, such as ether, is evaporated and then the assistant remained on the rubber surface is wiped by a cloth impregnated with a solvent for the assistant.

The treating solution assistant is used in an amount of 5 –300 parts by weight, preferably 20 - 150 parts by weight, per 100 parts by weight of iodine isocyanate.

As the treating solution assistant, liquid compounds, which is difficultly volatile at room temperature, that is, compounds having a boiling point of higher than 150°C and a melting point of lower than 0°C are preferably used. These compounds are compounds of the following ten groups (1) – (10).

1. Aromatic carboxylic acid esters represented by the following general formulae I and II.

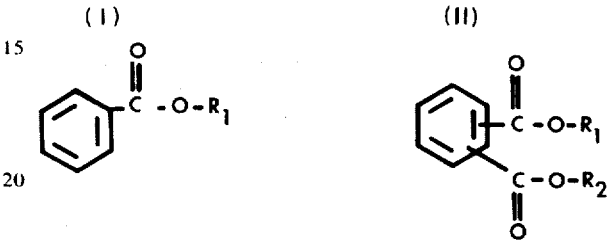

wherein $R_1$ and $R_2$ are hydrocarbon radicals having not more than 16 carbon atoms, hydrocarbon radicals having not more than 16 carbon atoms and containing ether linkage or ester linkage, or halogenated hydrocarbon radicals having not more than 16 carbon atoms. These hydrocarbon radicals include aliphatic, alicyclic and aromatic hydrocabon radicals.

As the aromatic carboxylic acid esters, mention may be made of dimethyl phthalate, diethyl phthalate, dipropyl phthalate, dibutyl phthalate, diisobutyl phthalate, diallyl phthalate, di-n-hexyl phthalate, dibenzyl phthalate, di-2-ethylhexyl phthalate, di-n-octyl phthalate, diisooctyl phthalate, dicapryl phthalate, octyl capryl phthalate, dinonyl phthalate, diisodecyl phthalate, ditridecyl phthalate, dicyclohexyl phthalate, dibutoxyethyl phthalate, bis(diethylene glycol monoethyl ether) phthalate, ethylphthalyl ethyl glycolate, methylphthalyl ethyl glycolate, butylphthalyl butyl glycolate, bis-2-fluorophenyl phthalate, bis-4-chlorophenyl phthalate, bis-2,4-dichlorophenyl phthalate, bis-2,4,6-trichlorophenyl phthalate and the like. In the above described esters, the acid component is phthalic acid, but benzoic acid, isophthalic acid and terephthalic acid may be used as an acid component instead of phthalic acid.

2. Dibasic saturated fatty acid esters represented by the following general formula III.

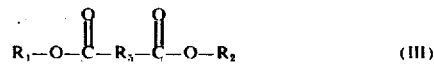

(III)

wherein $R_5$ is a saturated aliphatic hydrocarbon radical, and $R_1$ and $R_2$ are hydrocarbon radicals having not more than 16 carbon atoms, hydrocarbon radicals having not more than 16 carbon atoms and containing ether linkage or ester linkage, or halogenated hydrocabon radicals having not more than 16 carbon atoms.

The dibasic saturated fatty acid esters include diethyl adipate, diisobutyl adipate, di-n-hexyl adipate, diisooctyl adipate, dinonyl adipate, di-3,5-dimethylhexyl adipate, dimethoxyethyl adipate, diethoxyethyl adipate, dihexyl azelate, dioctyl azelate, dimethyl sebacate, diethyl sebacate, dihexyl sebacate, dioctyl sebacate, dicapryl sebacate, dibutoxyethyl sebacate, butyl benzyl sebacate, capryl benzyl sebacate, dibenzyl sebacate, di-2-chloroethyl sebacate and the like.

3. Phosphoric acid esters represented by the following formula IV.

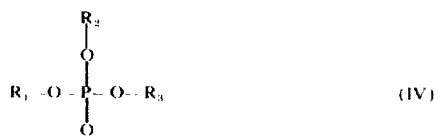

(IV)

wherein $R_1$, $R_2$ and $R_3$ are hydrocarbon radicals having not more than 16 carbon atoms, hydrogen radicals having not more than 16 carbon atoms and containing ether linkage or ester linkage, or halogenated hydrocarbon radicals having not more than 16 carbon atoms.

The phosphoric acid esters include triethyl phosphate, tributyl phosphate, tri-2-ethylhexyl phosphate, tributoxyethyl phosphate, triphenyl phosphate, cresyl diphenyl phosphate, tricresyl phosphate, tri-dimethylphenyl phosphate, diphenyl mono-o-xenyl phosphate, tri-p-tertbutylphenyl phosphate and the like.

4. Glycerin and trimethylolpropane derivatives represented by the following general formulae V and VI.

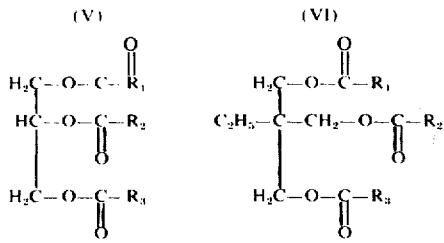

wherein $R_1$, $R_2$ and $R_3$ have the same meanings as described above.

The glycerin and trimethylolpropane derivatives include glycerol triacetate, glycerol tripropionate, glycerol tributyrate, trimethylolpropane triacetate, trimethylolpropane tripropionate, trimethylolpropane tributyrate and the like. When derivatives of hexane triol, which is an isomer of trimethylolpropane, are used instead of the trimethylolpropane derivatives, the same effect can also be expected.

5. Glycol derivatives represented by the following general formula VII.

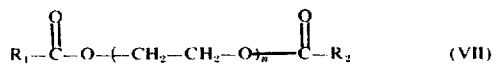

(VII)

wherein $R_1$ and $R_2$ have the same meanings as described above, and $n$ is a positive integer of from 1 to 10.

The glycol derivatives include diethylene glycol diacetate, diethylene glycol dipropionate, tetraethylene glycol dibutyrate and the like.

6. Pentaerythritol derivatives represented by the following general formula VIII.

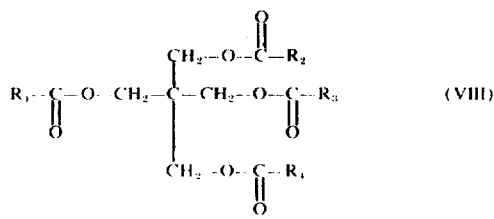

(VIII)

wherein $R_1$, $R_2$ and $R_3$ have the same meanings as described above, and $R_4$ has the same meaning as $R_1$, $R_2$ and $R_3$.

The pentaerythritol derivatives include pentaerythritol tetraacetate, pentaerythritol tetrapropionate, pentaerythritol tetrabutyrate and the like.

7. Mineral oils and vegetable oils having a boiling point of higher than 150°C and a melting point of lower than 0°C.

8. Organic silicone compounds having a boiling point of higher than 150°C and a melting point of lower than 0°C.

9. Epoxy compounds having a boiling point of higher than 150°C and a melting point of lower than 0°C.

10. Linear low molecular weight polymers, such as polystyrene oligomer, polybutadiene oligomer and the like.

Among them, the compounds of the groups (1)–(6), which are generally used as a plasticizer of plastic, and the oils of the group (7) are preferable.

Furthermore, among the above described compounds, the compounds having no active hydrogen prevent the decomposition of iodine isocyanate prior to the use, so that these compounds are preferable. However, when a surface of vulcanized rubber is treated in a short period of time, the compounds having active hydrogen can be used without causing serious problems.

An explanation will be made with respect to the method for improving the adhering ability of the vulcanized rubber in the present invention.

A. Vulcanized rubber particles treated with the iodine isocyanate solution of the present invention are firstly dispersed in an uncured polyurethane elastomer prepolymer, and then the dispersion is defoamed, poured into a mold, and cured therein to produce a composite material having a desired shape. Alternatively, only vulcanized rubber particles, the surface of which has previously been treated, are forcedly charged into a mold, and then uncured polyurethane elastomer prepolymer is filled in the spaces between the rubber particles under a pressure or by a centrifugal force, and then the mixture is cured therein.

The vulcanized rubber particles to be used in this treatment are produced by crushing vulcanized rubber. When vulcanized rubber, after cooled to a very low temperature by liquid air or liquefied natural gas, is crushed, particles of the vulcanized rubber can be easily obtained. However, vulcanized rubber particles produced by crushing or grinding at room temperature by means of a conventional apparatus can also be used advantageously. Particularly, since vulcanized rubber particles obtained from waste tire, waste conveyor belt and other waste articles can be utilized according to the present invention, the present invention is very valuable in view of these public nuisances. Rubber particles having various sizes can be used in the present invention. For example, rubber particles having a size of from 0.05 mm to about 2 mm can be used. However, in the present invention, the particle size is not particularly limited.

Furthermore, various fillers, softeners and other compounding agents may be compounded to the matrix prior to the curing as far as the addition does not not go beyond the object of the present invention. For example, powders of carbon black, silica, calcium carbonate, calcium sulfate, clay and sulfur, powders of various metals, metal oxide powders, inorganic fiber powders, organic fiber powders, plastic powders, wood powders, stone powders, corn powders vegetable oils, mineral oils, petroleum fraction, petroleum series softeners, synthetic plastics, asphalt, coal tar, and various antioxidants, ozone crack-preventing agents may be compounded to the matrix.

Even when a composite material, wherein black vulcanized rubber particles compounded with carbon, which have been treated with a solution of iodine isocyanate according to the present invention are dispersed in a colorless transparent polyurethane elastomer matrix, is bent, the maximum bent portion is still black without whitening. Moreover, even after the composite material has been subjected to periodic stresses and bent intermittently, the whitening phenomenon of the composite material is not observed. This means that in the composite material of the present invention, fine breakages are not formed in the interior of the portion, to which stresses are concentrated. In fact, the composite material of the present invention has a remarkably high fatigue resistance and can resist periodical large deformation.

The composite material of the present invention is remarkably useful for materials, which require bending resistance, such as tires for automobile, bicycle, etc., tire tubes, belts, vibration insulating rubbers, dock fender, rubber fence, flexible joint, flexible container, sporting goods, sealing agent, water-proofing agent, building materials for roof, wall and gasket for window frame, and base material for adhesive.

B. If the method for improving the vulcanized rubber according to the present invention is utilized for the method for retreading the pneumatic tire wherein the vulcanized tread rubber of the whole or a part of the tread portion is fixed to the base tire to be retreaded, at least the vulcanization step for adhering can be omitted and no vulcanizing installation is needed. Consequently, the cost is reduced and further the deterioration of the base tire resulting from the heating can be advantageously avoided, so that the life (durability) of the resulting retreaded tire can be more elongated and particularly, the adhesion having a high durability which has never been accomplished by the adhering by means of a rubber cement or usual hot melt type adhesive (for example, E.V.A.), can be achieved between the vulcanized and molded tread rubber and the base tire.

The method for retreading tires attained by the present invention is as follows.

a. A tread material conforming with the crown portion of the tire subjected to buffing is previously shaped by a mold.
b. Both the surfaces to be adhered of the base tire and the vulcanized tread layer are subjected to the surface treatment for improving the adhering ability to the high molecular material which is cured through the electrophilic reaction.
c. The thermosetting liquid material which converts from a fluid state of a relatively low molecule to an elastomer having an elasticity of a high molecule state by the progress of hydrogen transfer reaction of an electrophilic group and a nucleophilic group, is applied on any one surface or both the surfaces of the base tire and the tread layer and then the base tire and the tread layer are left to stand under forcedly contacted state to adhere them.

The method for retreading tires utilizing the present invention has the following merits as compared with the conventional well known process wherein the pressing and heating are essential and contemplates vulcanization and adhering. It is not necessary to effect heating under a pressure (in the conventional process, a pressure of about 5 Kg/cm$^2$ is necessary). The heating is not always necessary and even if the base tire and the tread layer are allowed to stand at room temperature under atmospheric pressure, the retreatment is completed.

Of course, in order to promote the integration of the base tire and the tread, it is possible to effect heating under atomospheric pressure, but also in this case, the heating is effected at a temperature at which the thermal deterioration does not occur.

It has never been anticipated that the object can be accomplished without deteriorating the base tire by keeping a low temperature of about 20° – 40°C for 16 – 24 hours.

Since it is possible to leave is standing under atmospheric pressure, it is not necessary to use a large machine (the conventional process uses a large machine capable of housing the tire to be retreaded) and consequently the retreatment of tire can be carried out in any place and this is very advantageous.

C. The method for improving the vulcanized rubber according to the present invention permits the production of pneumatic tire wheels having a high safety in which the tire and the rim are strongly bound at the bead portion.

Particularly, if a primer having such a melting point which is fully higher than the maximum temperature exposed in the actually used condition of the tire rim joint portion of the pneumatic tire wheel of the present invention but lower than about 170°C, is used, when if necessary, the once fixed tire is heated to a temperature at which the primer is molten, at the primer portion, the tire can be easily removed from the rim, and the setting is also easy.

It is great merits that it is possible to repair tires without impairing the tire and rim and to simply remove the tire from the rim and set the tire to the rim upon the exchange after the tire tread has been completely worn.

The preferred primers for such a purpose are Chemlok No. 218 and Conap No. 1146 as mentioned above and the like and when these primers are used, the tire can be easily removed from the rim and set to the rim by a usual process under such a condition that the tire-rim joint portion is heated uniformly at a temperature of lower than 170°C, preferably at about 100°C, which does not thermally influence upon the tire and rim, by hot air or electric heat and further the tire is not accidentally removed from the rim not only in an actual running but also under the punctured state.

When the melting point of this primer is too high, there is a fear that the quality of the tire body is deteriorated upon the removal and setting of tire and therefore after the investigation from various views, the melting point of the primer is desirable to be lower than 170°C, preferably lower than 140°C. An explanation will be made with respect to FIGS. 4 and 5.

FIG. 4 is a cross-sectional view of the pneumatic tire wheel according to the present invention in which the motor car tire 185/70-13 tubeless type radial structure tire is set to the rim 5J-13. FIG. 5 is a detailed view showing the bead portion where the tire and the rim are secured by adhering.

1 is a tubeless tire, which has a pair of bead wires 2 and a toroidal shape of carcass 3, both ends of which are wound to the bead wires. The carcass 3 is composed of 1,260 d/2 nylon cords arranged at an angle of 90° against the circumferential direction. A breaker 4 is arranged at an angle of 15° against the circumferential direction beneath the top surface of the tire and above the carcass and this breaker 4 is composed of two sheets of 1,650 d/3 rayon cords.

The bead portion 5 of the tubeless tire 1 is adhered with a rubber chafer 6 composed of a rigid rubber over the face contacting with the rim 7.

This tubeless tire 1 is set to the rim 7 according to the adhering method of the present invention.

The tire 1 and the rim 7 are adhered with urethane elastomer 11 from a bead toe 8 through a bead heel 9 to the vicinity of a rim flange 10. The rubber chafer is composed by compounding vulcanizers and reinforcing materials to NR/SBR = 95/5 rubber.

D. The method for partially repairing a tire utilizing the present invention is as follows.

The perforated damaged hole to be repaired is arranged in a shape capable of being readily repaired and fully washed to remove muddy soils and the like and then said hole is lined by a patch reinforced by a canvas and the like from the inside of the tire and then before a thermosetting liquid material is poured into the damaged hole from the surface side of the tire, the inner surface of the perforated damaged hole is subjected to the improving treatment according to the present invention, after which the above described thermosetting liquid material is poured thereto.

The thermosetting liquid material is preferred to have a hardness same as or lower than that of the tread rubber after hardened, so that for complying with this object, it is preferred to select polyurethane elastomer as the thermosetting liquid material.

An explanation will be made with respect to FIG. 6.

FIG. 6 shows a part of tire subjected to the partial repair utilizing the present invention and 13 is an embedding rubber (urethane), 14 is a tread, 15 is a case, 16 is a patch, 17 is a canvas and 18 is a rubber.

E. In the dock fender utilizing the present invention, the vulcanized rubber surface of the impact receiving portion in the dock fender subjected to the improving treatment of the present invention is adhered integrally with a synthetic resin layer. The thus formed dock fender does not separate the synthetic resin layer from the vulcanized rubber of the dock fender body.

An explanation will be made with respect to FIG. 7.

In FIG. 7, 19 is the dock fender body composed of the vulcanized rubber and 20 is a synthetic resin layer of, for example, polyurethane resin, epoxy resin and the like.

The following examples are given for the purpose of illustration of this invention and are not intended as limitations thereof.

EXAMPLE 1

A sheet of 2 mm thickness was prepared by vulcanizing a compounded rubber having each of the following two recipes at a temperature of 145°C and a pressure of 50 Kg/cm² for 30 minutes.

| Recipe of SBR | Part (Wt.) |
|---|---|
| SBR 1,500*¹ | 100 |
| carbon black | 50 |
| petroleum series softener | 20 |
| stearic acid | 2 |
| paraffin wax | 1 |
| styrenated phenol (phenolic antioxidant) | 3 |
| N-phenyl-N'-isopropyl-p-phenylenediamine (amine series antioxidant) | 1.0 |
| diphenylguanidine (vulcanization accelerator) | 0.5 |
| dibenzothiazolyl disulfide (vulcanization accelerator) | 1.0 |
| sulfur | 1.8 |
| zinc white | 3.0 |
| *¹SBR made by Japan Synthetic Rubber Co., Ltd. | |
| Recipe of EPDM | Part (Wt.) |
| Royalene 302*² | 100 |
| carbon black | 35 |
| zinc white | 5 |
| tetramethylthiuram monosulfide (vulcanization accelerator) | 1.5 |
| mercaptobenzothiazole (vulcanization accelerator) | 0.5 |
| sulfur | 1.5 |

*²EPDM made by Uniroyal Inc.

Then, the smooth surface of the resulting vulcanized rubber sheet was subjected to the surface treatment according to the present invention. That is, a brush was dipped in a solution consisting of 2 parts of iodine isocyanate, 2 parts of dioctyl phthalate and 96 parts of tetrahydrofuran and then this solution was applied on the surface of the vulcanized rubber sheet by means of the said brush. Such a procedure was repeated 5 times, in each time after the solvent was evaporated and then the rubber sheet was allowed to stand for 1 hour. Thereafter, dioctyl phthalate remaining on the surface of the vulcanized rubber sheet was wiped with a cotton gauze impregnated with acetone.

It was found that the surface of the thus treated vulcanized rubber sheet did not change in the shape at all. Of course, the cracks did not occur in the surface of the vulcanized rubber sheet.

An uncured polyurethane elastomer or epoxy resin having the following composition, which is a well-known adhesive, was cast on the vulcanized rubber sheet until the thickness of the elastomer or resin layer is 2 mm and then cured by allowing to stand at a temperature of 25°C for 24 hours in case of the polyurethane elastomer or for 72 hours in case of the epoxy resin.

| Composition of polyurethane elastomer | Part (Wt.) |
|---|---|
| Adiprene L-100 *³ | 100 |
| 4,4'-methylene-bis-(2-chloroaniline) (amine series cross-linking agent for polyurethane) | 14 |
| *³ Prepolymer made by E. I. Du Pont de Nemours Co. and containing an isocyanate group at the end and having the following characteristics: | |
| isocyanate content | 4.0–4.3% by weight |
| average molecular weight | about 2,000 |
| specific gravity | 1.07 |
| Composition of epoxy resin | Part (Wt.) |
| DER 332 *⁴ | 100 |
| triethylene tetramine (amine series curing agent for epoxy resin) | 14 |
| *⁴ Epoxy resin, reaction product of bisphenol A and epichlorohydrin made by Dow Chemical Inc. and having the following characteristics: | |
| epoxy equivalent | 172–178 |
| viscosity at 25°C | 4,000–6,000 cps. |

-continued

| Composition of polyurethane elastomer | Part (Wt.) |
|---|---|
| specific gravity | 1.16 |

A strip-like specimen having a width of 25 mm and a length of 160 mm was cut out from the resulting laminate and peeled off between the vulcanized rubber and the urethane elastomer or the epoxy resin at a peeling speed of 50 mm/min, at which an average peeling resistance indicating an adhesion was measured. For the comparison, the same adhesion test was carried out with the vulcanized rubber without the surface treatment according to the present invention.

The thus obtained results are shown in the following Table 1.

Table 1

| Vulcanized rubber | Surface treatment | Adhesion Kg/25 mm Polyurethane elastomer | Epoxy resin |
|---|---|---|---|
| SBR | '' | 34.9 | 16.3 |
|  | none | 0.5 | 1.2 |
| EPDM | '' | 43.5 | 19.5 |
|  | none | 0.8 | 1.2 |

From the above Table 1, it can be seen that the effect of the surface treatment according to the present invention is considerably larger than the case of no surface treatment.

EXAMPLE 2

The same surface treatment as described in Example 1 was carried out with a solution consisting of 5 parts of iodine isocyanate and 95 parts of tetrahydrofuran. The surface portion of the SBR vulcanized rubber was observed to be slightly deteriorated after the peeling. When the polyurethane elastomer was adhered to the thus treated SBR vulcanized rubber, the adhesion was 30.6 Kg/25 mm. In this case, cracks were caused in the vulcanized rubber close to the interface between the polyurethane elastomer and the vulcanized rubber.

The said solution was mixed with an equal amount of a solution consisting of 5 parts of iodine, 5 parts of dioctyl phthalate and 90 parts of tetrahydrofuran and then the resulting mixed solution was applied to the surface of the SBR vulcanized rubber as described above. In this case, the adhesion was 37.5 Kg/25 mm. Further, the surface portion of the vulcanized rubber was not deteriorated all.

From this example, it can be seen that the effect of preventing the deterioration of the rubber surface is enhanced by the addition of iodine.

COMPARATIVE EXAMPLE 1

The same adhesion test as described in Example 1 was carried out in the prior art, that is, the solution of iodine isocyanate in Example 1 was replaced by a 5% solution of triphenylmethane triisocyanate in methylene chloride which was prepared by diluting Desmodur R[=5] of commercially available organic polyisocyanate solution (*5: organic polyisocyanate made by Bayer Co., 20% solution of triphenylmethane triisocyanate in methylene chloride). The obtained results are shown in the following.

Adhesion Kg/25 mm

-continued

| | |
|---|---|
| SBR | 1.5 |
| EPDM | 1.1 |

As seen from the above data, the prior art using the conventional organic polyisocyanate shows a very low adhesion.

COMPARATIVE EXAMPLE 2

The adhesion test was carried out in the same manner as described in Example 1 except that ethylene-vinyl acetate copolymer (EVA) was used as a hot-melt adhesive instead of the polyurethane elastomer used in Example 1.

The specimen was prepared as follows.

The SBR vulcanized rubber sheet treated according to the present invention as described in Example 1 was contacted with the EVA sheet having a thickness of 2 mm and the following properties, bonded to each other under compression at 120°C and then cooled to obtain the specimen.

| Properties of EVA | |
|---|---|
| vinyl acetate content (Wt.%) | 28 |
| melt index g/min (ASTM D238-57T) | 150 |
| tensile strength Kg/cm$^2$ | 32 |
| density g/ml | 0.95 |
| refractive index ND[25] | 1.485 |
| heat softening temperature °C | 89 |

The peeling resistance of the specimen was measured at room temperature to obtain an adhesion of 23 Kg/25 mm. This adhesion value was not favourable as compared with the case using the polyurethane elastomer.

EXAMPLE 3

The procedure of Example 2 was repeated, except that the other treating assistants were used instead of dioctyl phthalate, to obtain the following results.

| | Adhesion Kg/25 mm |
|---|---|
| Diethyl phthalate | 28.5 |
| Dipropyl phthalate | 29.8 |
| Diethyl adipate | 30.3 |
| Triethyl phosphate | 28.2 |
| Glycerol tripropionate | 28.4 |
| Diethyleneglycol diacetate | 30.5 |
| Pentaerythritol tetracetate | 30.5 |
| Spindle oil | 26.3 |
| Silicon oil | 23.2 |
| Rape seed oil | 25.5 |

EXAMPLE 4

The brushes used in Examples 1, 2 and 3 were allowed to stand at room temperature without washing to evaporate tetrahydrofuran. Then, a light shock was given to these brushes by means of a stainless steel spatula, but a small explosion was not observed in all brushes.

A brush was dipped in the solution as described in Example 1 or 2 containing no dioctyl phthalate as a treating solution assistant, dried at room temperature and then given a light shock by means of a stainless steel spatula. In this case, an explosion which is very slight but small was observed.

As seen from the above, the present invention provides a high adhesion and a safe method.

EXAMPLE 5

This example illustrates a storage stability of the surface treating solutions according to the present invention.

An adhesion of the vulcanized SBR rubber to the polyurethane elastomer was measured in the same manner as described in Example 1 using various surface treating solutions as shown in the following Table 2. Further, these surface treating solutions were stored under a given condition for a given period, and thereafter the same measurement as described above was repeated so as to compare the storage stability of each surface treating solution.

The obtained results are shown in the following Table 2.

Table 2

| Surface treating solution | Adhesion just after the preparation Kg/25 mm | Storage temperature °C | Adhesion after the storage for 14 days Kg/25 mm |
|---|---|---|---|
| A | 34.8 | 5 | 2.2 |
|   |      | 22 | 1.5 |
| B | 38.5 | 5 | 37.0 |
|   |      | 22 | 4.3 |
| C | 39.2 | 5 | 35.0 |
|   |      | 22 | 15.8 |
| D | 38.6 | 5 | 34.9 |
|   |      | 22 | 33.8 |
| E | 37.5 | 5 | 33.2 |
| F | 36.8 | 5 | 34.5 |

Note) Composition of the surface treating solutions:
A  iodine isocyanate, tetrahydrofuran
B  iodine isocyanate, tolylene diisocyanate, tetrahydrofuran
C  iodine isocyanate, tolylene diisocyanate, tetrahydrofuran, iodine
D  iodine isocyanate, tolylene diisocyanate, dioxane
E  iodine isocyanate, trimethylolpropane tolylene diisocyanate adduct (Desmodur L, made by Bayer Co.), tetrahydrofuran, iodine
F  iodine isocyanate, triphenylmethane triisocyanate, tetrahydrofuran, iodine From the above Table 2, it can be seen that the effect of the present invention is enhanced by the addition of the organic isocyanate as an assistant and/or iodine and dioxane is effective as a solvent.

EXAMPLE 6

Two vulcanized SBR rubber sheets of 10cm×10cm×2mm having the recipe as described in Example 1 were subjected to the surface treatment with the surface treating solution used in Example 1 and tightly contacted with each other and then bonded by pressing and heating under various conditions. The peeling resistance of the resulting assembly was measured at 22°C or 100°C to obtain the results as shown in FIGS. 2 and 3.

FIG. 2 is a diagram showing a relation between the peeling resistance and the heating temperature under a pressure of 15 Kg/cm².

FIG. 3 is a diagram showing a relation between the peeling resistance and the pressure at a temperature of 150°C.

From these FIGS. 2 and 3, it can be seen that by properly selecting the temperature and pressure conditions the vulcanized rubber sheets are bonded to each other in a short time without using an adhesive.

EXAMPLE 7

A plurality of vulcanized rubber cylinders having a thickness of 3.2±0.2mm and a diameter of 40.56±0.03mm were manufactured by vulcanizing SBR compounded rubber as described in Example 1. The upper and lower surfaces of these rubber cylinders were treated in the same manner as described in Example 1 using the surface treating solution used in Example 1.

Separately, a plurality of steel cylinders having the same diameter and a thickness of 9.53 mm were provided.

The surfaces of these steel cylinders were considerably smoothened and coated with a very thin layer of various primers as mentioned below. In addition, steel cylinders not coated with the primer were also provided.

The rubber cylinder was held between the two steel cylinders and bonded by pressing at 150°C under a pressure of 15 Kg/cm² for 10 minutes to obtain a specimen. Then, the peeling resistance of the specimen was measured according to the method of JIS K6301-8 to obtain the following result.

When the rubber cylinder was used without the treatment using the surface treating solution according to the present invention, this rubber cylinder did not adhere to the steel cylinders, so that the sandwich specimen as described above was not obtained.

| Primer coating | Adhesion Kg/25 mm |
|---|---|
| none | 15 |
| Chemlok No. 218 | 56 |
| Conap No. 1146 | 53 |
| Phenol-formaldehyde resin | 68 |
| Epoxy resin (described in Example 1) | 41 |

Surprisingly, it can be seen from the above results that a fairly high adhesion is obtained by the method of the present invention without the primer coating.

EXAMPLE 8

A vulcanized SBR rubber sheet of 2 mm thick as used in Example 1 was provided and then treated at its surface with the same surface treating solution as described in Example 1.

A sheet of 2 mm thick was prepared from the polyurethane elastomer or epoxy resin as mentioned in Example 1.

These sheets were tightly contacted with and bonded to each other by thermal compression at 150°C under a pressure of 15 Kg/cm² for 10 minutes, whereby a two-layer laminated assembly was obtained. The force required for peeling off both the layers was measured to obtain an adhesion between the layers.

|  | Adhesion Kg/25 mm |
|---|---|
| SBR-Polyurethane elastomer | 38.4 |
| SBR-Epoxy resin | 23.5 |

As seen from the above, both the sheets are very strongly bonded to each other.

The vulcanized rubber not treated with the surface treatment according to the present invention did not adhere at all, so that the above described laminate was not able to be obtained.

From this Example, it can be seen that according to the present invention the vulcanized rubber is easily adhered to the thermosetting materials, such as polyurethane elastomer and epoxy resin in a short time without using the adhesive.

EXAMPLE 9

The vulcanized SBR rubber sheet of 2 mm thick used in Example 1 was treated with the surface treating solution as described in Example 1 and then bonded to a thermoplastic urethane elastomer sheet of 2 mm thick in the same manner as described in Example 8 by thermal compression under the following conditions. In this case, the peeling resistance was 28.6 Kg/25 mm.

However, the vulcanized rubber not treated with the surface treatment according to the present invention was not able to bond to the thermoplastic urethane elastomer and no laminate was obtained as in Example 8.

Thermoplastic urethane elastomer: Paraprene 25SH made by Nippon Polyurethane K.K. (softening point 130°C)
Thermal compression condition: 150°C×5Kg/cm²×5min.

EXAMPLE 10

100 g of vulcanized rubber particles having the same recipe as described in Example 1 and an average particle size of about 0.5 mm were charged in 400 g of a 0.1% solution of iodine isocyanate in tetrahydrofuran at 25°C and after it was confirmed that the whole surfaces of the particles were covered with the said solution, the solution was filtered off to remove the solution. The thus treated vulcanized rubber particles were dried in air, whereby tetrahydrofuran adhered on the particles was immediately evaporated.

It was found that there is no change in the surface of each of the thus treated vulcanized rubber particles. Further, cracks in the surface of such particles were not found even by observing through a magnifier. 100 parts of such vulcanized rubber particles were charged in 200 parts of uncured polyurethane elastomer having the composition described in Example 1 and then the resulting mixture was defoamed while stirring. The thus obtained fluid was poured into the mold for a de Mattia machine according to the method B of ASTM D-430-59 which is used in the bending resistance test of the vulcanized rubber and then heated at 100°C under an atmospheric pressure for 3 hours to obtain a composite material specimen in a desired form. The specimen was set on the said machine under a defined condition and then the bending resistance was measured. The bending resistance is defined by the bending time from the starting to the occurrence of cracks. The average bending time of 12 specimens was 64,000 times. During the bending test, the whitening phenomenon was not observed in the maximum bent portion of the specimen.

COMPARATIVE EXAMPLE 3

The bending test was repeated in the same manner as described in Example 10, except that the vulcanized rubber particles not treated with the surface treatment according to the present invention were used. The bending time of the obtained specimen was about 3,650 times and was considerably inferior to that of the present invention. Furthermore, the whitening was observed in the maximum bent portion of the specimen from the first, and also the whitening degree considerably increased with the increase of the bending time and the whitened portion was extended.

Example 10 and Comparative Example 3 show that the composite material according to the present invention has a very excellent bending fatigue resistance.

EXAMPLE 11

When a mixed solution of iodine isocyanate and iodine was used instead of the solution of iodine isocyanate in Example 10, the bending time of the specimen was 68,500 times.

This Example shows that a favourable effect is obtained by adding iodine to the solution of iodine isocyanate.

EXAMPLE 12

A steel cord reinforced tire for trucks (size: 10.00 R20 14PR) made be Bridgestone Tire Co., Ltd., whose tread surface has been completely worn by the practical running, was used as a base tire. The tread rubber of this tire was cut and removed by means of a peeling machine so as to leave 1 mm of rubber layer on the steel cords in the breaker. After the cut surface was wiped and cleaned with acetone, a 2 percent solution of iodine isocyanate in tetrahydrofuran was applied on the surface four times by means of a brush and then the solvent was volatilized.

Separately, SBR compounded with carbon was vulcanized and molded in a mold having a tread pattern to produce a strip-shaped tread rubber, and the inner surface of the tread rubber to be contacted with the base tire was treated in the same manner as described in the base tire.

Then, a 20 percent solution of an uncured polyurethane elastomer, which had a composition and physical properties as shown in the following Table 3, in acetone was applied on the above treated two vulcanized rubber surfaces to be adhered.

Table 3

|  | Part (by weight) | |
|---|---|---|
| Coronate 4090*⁶ | 100.0 | |
| MOCA*⁷ | 10.9 | |
| Before curing | Viscosity: | 1,000 cp at 75°C |
| After curing | Strength at break: | 425 Kg/cm² |
|  | Modulus of elasticity: | 80 Kg/cm² |
|  | Hardness: (JIS) | 90° |

*⁶Polyurethane elastomer, isocyanate group-terminated polyether made by Nippon Polyurethane K.K.
*⁷Curing agent, 3,3'-dichloro-4,4'-diaminodiphenylmethane.

Then, the same polyurethane elastomer as described above, which was not dissolved in the solvent and was semifluid, was applied on the surface of the base tire to be adhered by the doctor knife method so that the thickness of the adhesive layer was less than 0.5 mm, and then the above treated strip-shaped tread rubber was wrapped on the whole circumference of the base tire while pressing, after which the assembly was fixed by means of a jig and then left to stand for 24 hours under atmospheric pressure in a room kept at 25°C. As the result, the strip-shaped tread rubber and the base tire were united to form a tire.

EXAMPLE 13

The treatment of Example 12 was repeated, except that a tetrahydrofuran solution containing 5% iodine isocyanate and 2% of iodine was used, and the application time of this solution was varied to two times. The obtained result was the same as that of Example 12. Further, the deterioration of rubber surface was not at all observed.

Examples 12 and 13 explain the application of the present invention to the so-called Bandag system, wherein a tread material on which the tread pattern has previously been formed, is vulcanized, and then the tread material is adhered to a base tire. However, the application of the present invention is not limited to the Bandag system only. The present invention may be carried out according to the Re-Lug system. In this case, the lug and undertread formed by extrusion molding are previously vulcanized, and these vulcanized tread materials are fixed to a base tire according to the adhering method of the present invention.

EXAMPLE 14

A method for producing pneumatic safety tires of the present invention will be explained referring to FIGS. 4 and 5.

a. A 10% solution of iodine isocyanate in dioxane was applied by means of a brush on a bead toe 8 and a bead heal 9 to be contacted with a bead set 12 of the rim 7, and the whole outer surface of a bead portion 5 to be contacted with a rim flange 10 to effect a surface treatment of the rubber. After the solvent was evaporated, this surface treatment was repeated further two times to improve the rubber with iodine isocyanate.

b. Since the rubber of the bead portion 5 of the tire 1 contains amine series antioxidant, a 10% solution of a low molecular weight isocyanate compound, 2,4-tolylene diisocyanate, in dioxane was applied on the above treated rubber surface one time in order to prevent the migration of the antioxidant.

c. After the solvent was evaporated, a polyurethane elastomer solution having a composition as shown in the following Table 4 was applied on the above treated rubber surface by means of a brush.

Table 4

|  | Part (by weight) |
| --- | --- |
| Coronate 4090 | 10.0 |
| MOCA | 1.1 |
| Acetone | 38.9 | d. While, a corrosion-resistant paint applied on the inner surface of a bead seat 12 of the rim 7 was removed by sand paper, and wiped and cleaned with methyl ethyl ketone. Then, a primer, Chemlock No. 218, was applied on the rim 7, and the rim 7 was dried in an oven kept at 70°C for 45 minutes.

e. The rim 7 was taken out from the oven, and a polyurethane elastomer having a composition as shown in the above described Table 3 was applied uniformly on all over the primer layer by means of a spatula so that the thickness of the polyurethane elastomer layer was about 1 mm.

f. The tire 1 and the rim 7 applied with the adhesives as described above were assembled to produce a pneumatic tire, and the inner pressure was made to normal pressure, after which the pneumatic tire was left to stand for 24 hours at room temperature to dry the adhesives.

Since a fluid adhesive was adhered to the bead seat 12 of the rim 7, the tire 1 slided smoothly on the rim 7 at the assembling, and the assembling was very easy.

In the above described procedures (a) – (f) for bonding a tire and a rim, the procedure (c) may be omitted, and the polyurethane elastomer shown in Table 3 may be used in place of the polyurethane elastomer shown in Table 4. However, when the procedure (c) is carried out, a thin uniform adhesive layer is formed on the surface of tire bead, and it can be expected that the bonding of a tire with a rim becomes more tightly.

Several specimens in which the tires and the rims were adhered in this manner, were produced and the test for confirming the following properties was made. In the following description, A is the tire bonded with the rim in the method as described above and B is the tire set in the rim without bonding.

1. UNSEATING RESISTANCE OF TIRE BEAD

The value of A in the following Table A is not one when the tire unseats from the adhered portion but is one when the tire unseats from the rim by stripping off the rubber layer of the tire bead.

Table 5

| Tire | Measured value (Kg) | Inner pressure (Kg/cm²) |
| --- | --- | --- |
| A | 1,850 | 1.7 |
| B | 1,300 | |

Note:
Unseating resistance was measured following to "Tubeless Tire resistance to Bead Unseating" defined in Federal Mortor Safety Standard, which is tire safety standard in USA.

2. ROTATION TEST

The test tire was set to the right side forward wheel of a personal car and the inner pressure was exhausted and then the dead weight corresponding to the defined five members was mounted in this car. Then, this car was subjected to a rotation test of left turning at a circle of a radius of 5 m in a constant speed of 20 Km/hr. As the result, in A. the side wall of the tire was broken by friction after 30 time rotations, so that the rotation was interrupted but any change was not observed at the adhered face of the above described tire bead portion.

On the contrary, in B, the bead portion of the tire was already fallen into the concave of the center portion of the rim before the car run a half circle of the rotation and the successive rotation was not possible.

3. SAFE TEST

The following test was made that the tire is allowed to be punctured suddenly when the personal car is straightly running at a speed of 140 Km/hr in a high speed running test field and then the speed is safely reduced and the car is stopped. The initial inner pressure of the tire was 1.7 Kg/cm² and the test tire was set to the right side forward wheel of the car.

In A, instantaneously after the tire was punctured, the handling became unstable but was able to be controlled and thereafter the slow running, running or stop operation was easily conducted.

While, in B. instantaneously after the tire was punctured, the tire bead was fallen into the concave of the center portion of the rim, so that the car was unable to run stably and lost the stability and turned laterally.

4. DURABILITY TEST IN RUNNING IN A PUNCTURED STATE.

A safety tire reinforced so as to endure the running in a punctured state, in which an elastic reinforcing material is cohered to the inner surface of the side wall of the same kind of tire (Japanese Patent Application No. 62,114/72) was bonded with the rim in the same manner as described above and the thus assembled tire was set to the backward one side of the car. From the tire the inner pressure was exhausted and the dead weight corresponding to the defined riding members was mounted on the car and after the car was run 300 Km at an average speed of 80 Km/hr on a circular road in a high speed running test field, the state of the above described joint portion of the bead was determined, but any change was not found and when the inner pressure was filled, the sealing property of the tire was complete.

5. REMOVAL AND SET TEST OF RIM

When the inner pressure of this tire was again exhausted and the tire was placed in an oven heated at 100°C and the heating was continued for 2 hours, the primer applied on the bead seat of the rim was molten and the tire was easily removed from the rim by a usual process.

The primer was again applied on the above described bead seat of the rim in the same manner as described in the above described Example and then the polyurethane elastomer as shown in the above Table 3 was applied thereon and the taken out tire was set to the rim. The inner pressure was filled under a normal pressure and the resulting assembly was left to stand at room temperature for 24 hours. The bonding became complete and the same performance as in the first bonding was obtained.

Furthermore, in this Example, an explanation was made with respect to the case where the coating of a steel rim was removed but if the coating and the metal surface were strongly adhered, it is not necessary to remove the coating and when an aluminum rim or a glass fiber reinforced plastic rim was used, the similar good results were obtained.

Thus, the present invention can provide tire wheels which can run safely and in which the pneumatic tire and the rim are simply adhered.

What is claimed is:

1. A method for improving an adhering ability of a surface of a vulcanized rubber, which comprises treating said vulcanized rubber surface with a 0.01 to 5% by weight solution of iodine isocyanate in an organic solvent in such an amount that the amount of iodine isocyanate applied on the vulcanized rubber surface is 0.001 to 500 mg/cm$^2$.

2. The method as claimed in claim 1, wherein said iodine isocyanate solution is mixed with iodine.

3. The method as claimed in claim 1, wherein said iodine isocyanate solution is mixed with at least one of treating assistants selected from the group consisting of 1. aromatic acid esters having the general formulae I and II.

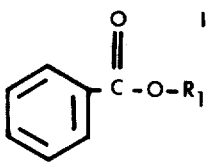 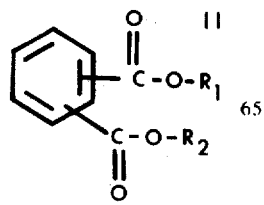

2. dibasic saturated aliphatic acid esters having the general formula III

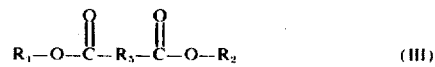

3. phosphoric acid esters having the general formula IV

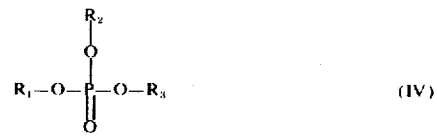

4. derivatives of glycerin and trimethylol propanes having the general formulae V and VI

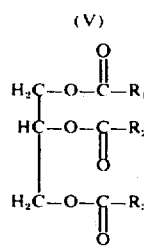 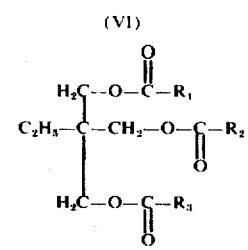

5. glycol derivatives having the general formula VII

6. pentaerythritol derivatives having the general formula

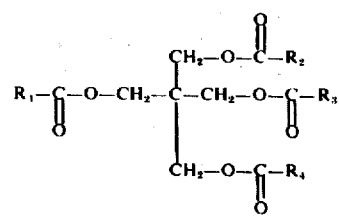

wherein $R_1$, $R_2$, $R_3$ and $R_4$ represent aliphatic and aromatic hydrocarbon radicals having not more than 16 carbon atoms, aliphatic and aromatic hydrocarbon radicals containing ether linkage or ester linkage having not more than 16 carbon atoms and aliphatic and aromatic halogenated hydrocarbon radicals having not more that 16 carbon atoms, $R_5$ represents saturated aliphatic hydrocarbon radicals having 2-10 carbon atoms and $n$ is an integer of 1-10.

7. oils having a boiling point of higher than 150°C and a melting point of lower than 0°C selected from the group consisting of mineral oils and vegetable oils, 8. organic silicone compounds having a boiling point of higher than 150°C and a melting point of lower than 0°C.

9. epoxy compounds having a boiling point of higher than 150°C and a melting point of lower than 0°C.

10. linear low molecular polymers of polystyrene oligomer and polybutadiene oligomer.

4. The method as claimed in claim 3, wherein said assistant is selected from the group consisting of diethyl phthalate, dipropyl phthalate, dioctyl phthalate, diethyl adipate, triethyl phosphate, glycerol tripropionate, diethyleneglycol diacetate, pentaerythritol tetracetate, spindle oil, silicone oil, and rape seed oil.

5. The method as claimed in claim 1, wherein said iodine isocyanate solution is mixed with an organic isocyanate compound.

6. The method as claimed in claim 5, wherein said organic isocyanate compound is tolylene diisocyanate, trimethylolpropane tolylene diisocyanate adduct, triphenylmethane triisocyanate.

7. The method as claimed in claim 1, wherein said organic solvent is dioxane.

8. A method for improving an adhering ability of a vulcanized rubber surface, which comprises treating said surface with a 0.01 to 5% by weight solution of isocyanate, dioctyl phthalate and tolylene diisocyanate in dioxane in such an amount that the amount of iodine isocyanate applied on the vulcanized rubber surface is 0.001 to 500 mg/cm$^2$.

* * * * *